(12) United States Patent
Crossan et al.

(10) Patent No.: US 6,881,084 B2
(45) Date of Patent: Apr. 19, 2005

(54) HERMAPHRODITIC CONNECTOR SYSTEMS

(76) Inventors: Pat Crossan, Station House, Kinsale, Co. Cork (IE); Kathleen O'Reilly, Kilgobbin, Ballinspitt Le, Kinsale, Co. Cork (IE)

( * ) Notice: Subject to any disclaimer, the term of this patent is extended or adjusted under 35 U.S.C. 154(b) by 112 days.

(21) Appl. No.: 10/148,968
(22) PCT Filed: Dec. 8, 2000
(86) PCT No.: PCT/IE00/00144
§ 371 (c)(1),
(2), (4) Date: Jun. 7, 2002
(87) PCT Pub. No.: WO01/42839
PCT Pub. Date: Jun. 14, 2001

(65) Prior Publication Data
US 2003/0013337 A1 Jan. 16, 2003

(30) Foreign Application Priority Data
Dec. 8, 1999 (IE) .................................. 991030
Sep. 4, 2000 (IE) .......................... S2000/0693

(51) Int. Cl.$^7$ ............................................. H01R 13/28
(52) U.S. Cl. ..................... 439/292; 439/310; 439/284
(58) Field of Search ..................... 439/284, 290–294, 439/310, 311; 285/65, 66, 325, 361, 398, 402

(56) References Cited

U.S. PATENT DOCUMENTS

| | | | | |
|---|---|---|---|---|
| 611,618 A | * | 10/1898 | Farrow | 285/66 |
| 1,093,528 A | * | 4/1914 | Bowes, Jr. | 285/86 |
| 2,513,305 A | * | 7/1950 | Gagnier et al. | 439/722 |
| 2,591,437 A | * | 4/1952 | Jun | 439/290 |
| 2,987,691 A | * | 6/1961 | Ross | 439/294 |
| 3,129,993 A | * | 4/1964 | Ross | 439/294 |
| 3,252,124 A | * | 5/1966 | Hansen | 439/291 |
| 3,461,258 A | * | 8/1969 | Shlesinger, Jr. | 200/253.1 |
| 3,649,052 A | * | 3/1972 | Snyder, Jr. | 285/38 |
| 3,855,566 A | * | 12/1974 | Richardson | 439/294 |
| 3,953,099 A | * | 4/1976 | Wilson | 439/205 |
| 4,688,833 A | * | 8/1987 | Todd | 285/148.14 |
| 5,149,149 A | * | 9/1992 | Wu | 285/402 |
| 5,658,159 A | * | 8/1997 | Gardner et al. | 439/294 |
| 5,788,291 A | * | 8/1998 | Williams et al. | 285/325 |
| 5,800,196 A | * | 9/1998 | Rudoy et al. | 439/284 |
| 5,857,867 A | * | 1/1999 | Henry | 439/290 |
| 6,325,425 B1 | * | 12/2001 | Kierath et al. | 285/352 |

* cited by examiner

Primary Examiner—Tho D. Ta
Assistant Examiner—Larisa Tsukerman

(57) ABSTRACT

A hermaphroditic connector for the connection of electrical and/or optical systems is described. The system comprises a coupling having a first and a second connector. Each connector (100) comprises an outer sleeve (101) and an insert housing (102). The outer sleeve (101) has an engagement member (103) and the insert housing comprises a substantially cylindrical base portion (104) and a single upstanding portion (105) having a co-operable engagement member (106). The upstanding portion (105) of the insert housing (102) of the first connector is adapted to mate with and form a cylindrical inner sleeve with a corresponding upstanding portion (105) of a second connector. The engagement member (103) is adapted to engage, in use, with the co-operable engagement member (106) of the second connector to which the connector is to be mated. Each connector may also be provided with an insert member, the insert member having a hermaphroditic profiled end portion adapted to mate with corresponding insert member of an opposing connector; the mating providing alignment between the systems that require connection.

24 Claims, 8 Drawing Sheets

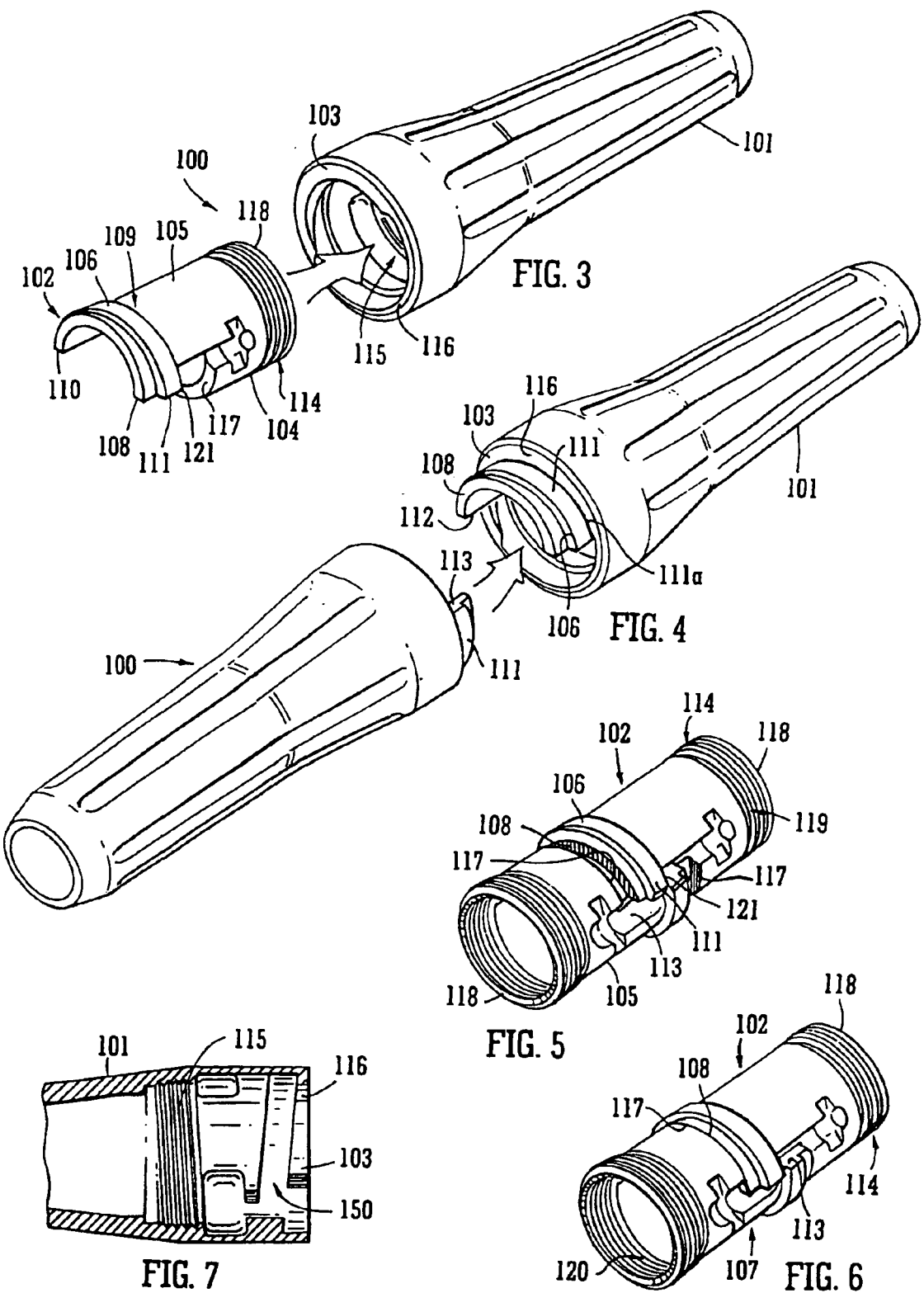

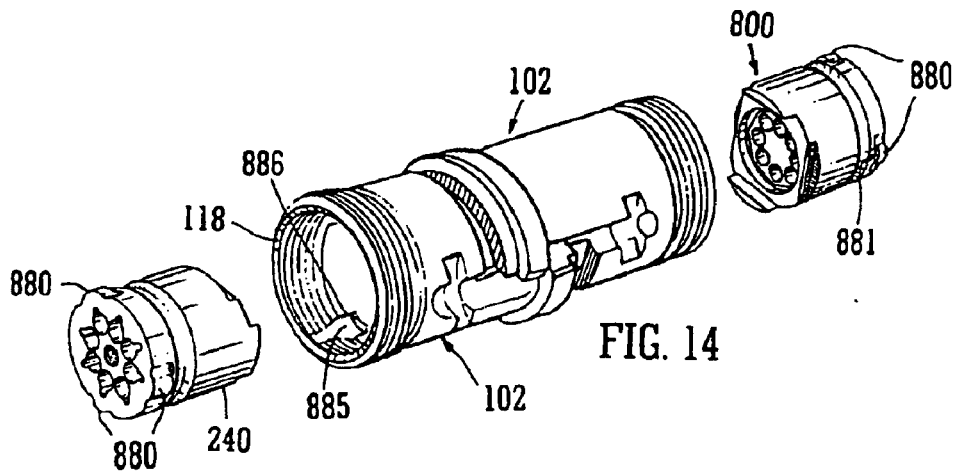
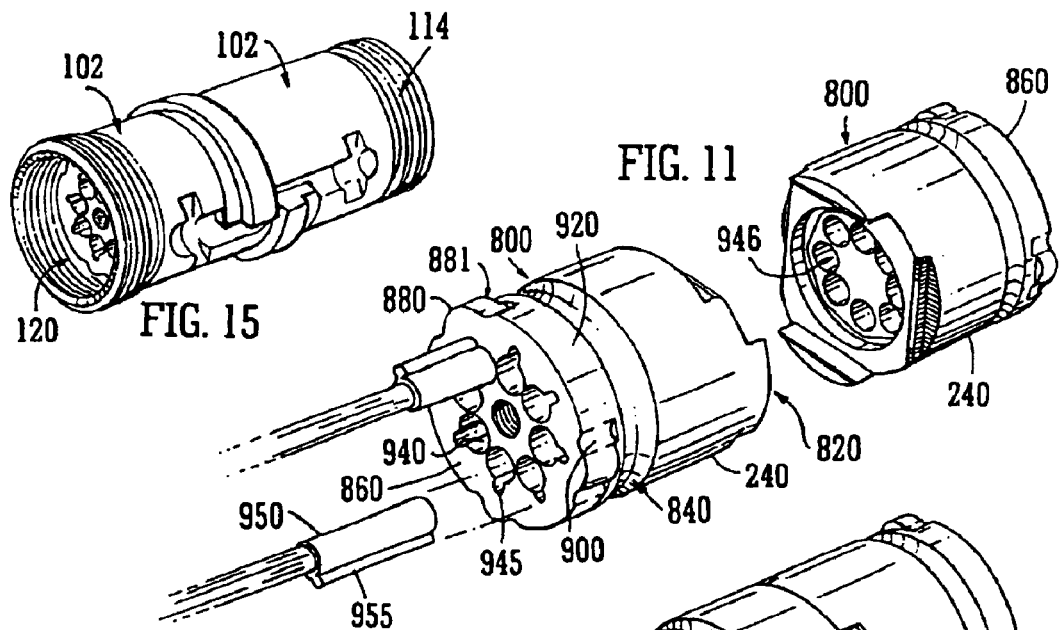
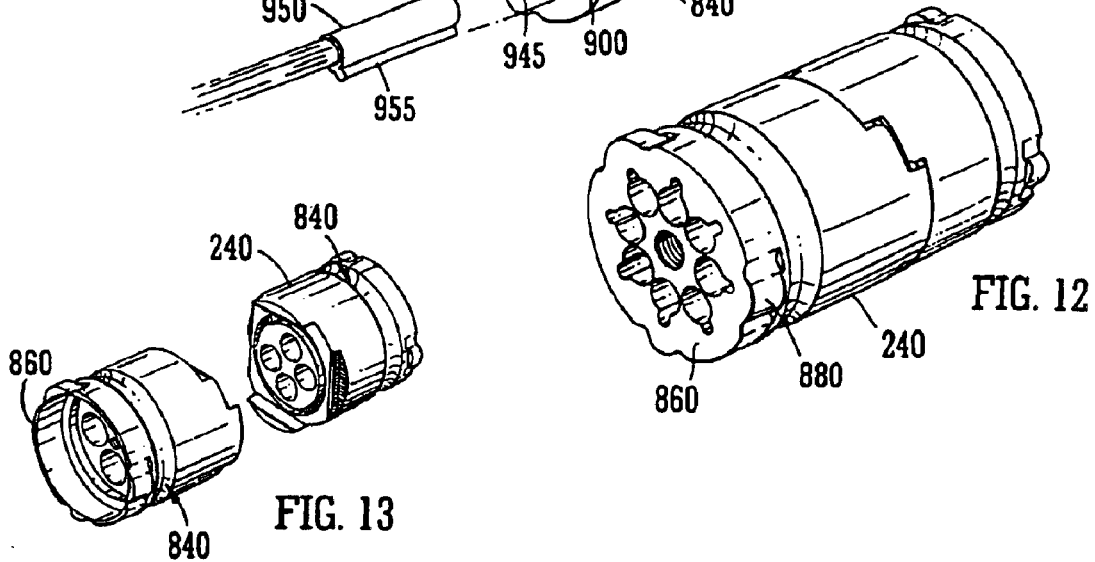

HERMAPHRODITIC CONNECTOR SYSTEMS

FIELD OF THE INVENTION

The invention relates to connectors and in particular to hermaphroditic connectors of the type used for connecting optical fibre cables.

BACKGROUND TO THE INVENTION

Optical fibre communication systems often have to operate in harsh conditions and environments. The cables and the connectors that join the cable lengths together need to be of a rugged construction. It is seen as an advantage if the connectors are hermaphroditic, so that all plug and bulkhead connectors can mate together without the need for adapters. This advantage is not limited to optical systems as it will be appreciated that hermaphroditic connectors have applications in many systems including electrical and/or hybrid electrical and optical systems.

Harsh environment optical connectors have been used for about twenty years, principally for military applications. A typical commercial connector is hermaphroditic, with each half connector comprising two protruding lugs that mate with each other. The lugs are substantially diametrically opposed to one another with each lug having a screw thread on the outside. During the mating process the lugs on each half connector combine to form a cylindrical inner sleeve which may be brought into axial alignment by the securing in position of the lugs using a tube on the outside of each connector half. The engagement of the tube on the outside with the threads on the opposite half connector draws the optical components into alignment as the outer tubes are drawn into the locked position.

The provision of two diametrically opposed lugs on each connector half results in the possibility of the connector halves being connected in one of two possible positions, each position approximately 180° opposed to the other position. Manufacturers typically obviate this possibility by producing the lugs of non-equivalent dimensions such that the inner cylindrical sleeve is only achieved when the lugs are presented in a single position. Although this ensures that the connector halves can only achieve mating in one position, it does introduce difficulties in "blind mating" situations.

A further problem with the known connectors is that the locking mechanism is achieved by independent rotation and threading of a locking sleeve with the threads on the lugs or the opposing half connector. This requires a double action locking mechanism; the securing of a first connector outer sleeve to the inner lugs of the second connector, followed by the securing of the second connector outer sleeve to the inner lugs of the first connector.

Yet a fiber problem with known connectors is the fact that the locking of the sleeve about the lug is not part of the mating procedure, i.e. the opposing lugs are mated and it is the subsequent rotation and screwing of the sleeve onto the lug that achieves the locking. There is, therefore, no specific relationship between the axial alignment and the locking of the opposing half connectors, which may result in the user achieving incomplete locking, although axial alignment of the inner lugs is achieved, or complete locking and inadequate axial alignment.

Examples of such known connectors include those described in EP-A-0 114 230 and EP-A-0 166 636, EP-A-0 114 230 discloses an arrangement wherein initial location is provided by means of a pin in a socket, with locking of the two connectors being achieved by rotation of grip rings. FP-A-0 166 636 describes an arrangement which effects location of two opposing connectors using tapered lugs, and once located the rotation of grip rings serves to tighten the tapers against one another.

Heretofore have been described known external connectors and the problems associated therewith. Although there are problems in connector systems with providing a rugged connection suitable for harsh conditions that can be closed or opened easily when required, additional problems arise when aligning the components within the connectors so as to achieve optimum alignment/interengagement between related components when the two connector half portions are connected so as to form a sealed connector. Typically, the components are housed within an insert member, opposing insert members coming into interengagement once the connector half portions are connected so as to form the sealed connector. In known systems this alignment of the opposing members is achieved using a pin and socket arrangement, wherein one of the insert members comprises a pin which is adapted to be received within a socket of the opposing insert member.

This known pin and socket arrangement serves to align, within optical systems, the optical channels both axially and angularly. The insert member is machined to extremely fine tolerance and it achieves the required level of perpendicularity between the front mating surface and the channel bores because it is machined in one single operation. In order to protect the optical elements from contamination each channel typically has a coated glass window in a screw housing. The pin and socket are not easy to keep clean, and the pin is also prone to damage and as a result tends to seize up in its socket, which prevents the connector from de-mating.

The above pin and socket arrangement is typically used within optical applications for expanded beam connectors. In such expanded beam connectors or lens connectors a polished optical fibre end is supported in a ferrule and is aligned axially with a lens to produce an expanded beam that passes between the two halves of the connector and is focused down through another lens onto the receiving fibre end surface. An alternative method of transmitting light between two connector half portions is to use a butt joint connection. Butt joint connections comprise two opposing optical fibres each being supported in a ferrule, and when the fibre emerges from the ferrule end it is polished to provide a surface which is suitable to transfer light onto the opposing equivalent fibre end in the other half portion. In use, the two ferrules are axially aligned and positioned such that the two fibre ends are in contact. When aligning opposing insert members which house the ferrules supporting the fibres, known methods typically employ a sleeve to align the two mating ferrules. This results in very low loss coupling, provided that there is no contamination. However, it is difficult to clean inside an alignment sleeve, which is why this type of connection has normally only been used in clean environments.

The expanded beam method traditionally has been used in harsh environment applications since the expanded beam gives a better chance of transmitting light in the presence of contamination, whereas in alternative butt joint connections even small particles of dust may reduce the transferred optical power to unacceptably low levels. Problems with expanded beam include the fact that, as they are extremely sensitive to angular misalignment, excess loss is often caused by an accumulation of axial errors among the optical elements involved, which leads to angular misalignment.

There is therefore a requirement to provide an improved alignment means for aligning two opposing insert members when connecting them together into a sealed connector.

OBJECT OF THE INVENTION

It is an object of the present invention to provide an improved hermaphroditic connector coupling mechanism. It is a further object of the present invention to provide an improved alignment means for aligning specific components within a connector during the coupling process.

SUMMARY OF THE INVENTION

Accordingly, the present invention provides an hermaphroditic connector comprising an outer sleeve and an insert housing adapted to receive an insert member, the outer sleeve having an engagement member and the insert housing having a co-operable engagement member, the co-operable engagement member being adapted, in use, to engage with the engagement member of the outer sleeve of an opposing second connector to which the connector is to be mated.

The engagement between the two engagement members is preferably effected by the receipt within one engagement member of the other engagement member.

The outer sleeve engagement member is preferably an inwardly projecting lip member adapted to receive and engage with an outwardly projecting lip member of the insert housing, although an opposite arrangement may be equally suitable.

The engagement members are typically helically dimensioned.

In one embodiment the present invention provides an hermaphroditic connector comprising an outer sleeve and an insert housing adapted to receive an insert member, the outer sleeve having an inwardly projecting lip member and the insert housing having an outwardly projecting lip member, the housing lip member being adapted to engage in use behind the sleeve lip member of a second connector to which the connector is to be mated.

Preferably, the housing comprises a tube with a half cut away section at one end thereof. Preferably, the sleeve comprises a tubular member.

In one embodiment, the connector comprises a cam in the form of a pin on the insert housing which engages with a slot on the outer sleeve. Preferably the slot extends through two lateral dimensions of the sleeve such that relative rotation of the housing in the sleeve causes linear movement between the housing and the sleeve or vice versa.

In a preferred embodiment the invention provides a connector comprising:

a) an outer sleeve having a retention portion provided adjacent to a presentation surface of the outer sleeve, and b) an insert housing, the insert housing being threadably engageable within the outer sleeve, the insert housing comprising a base portion with a part-cylindrical portion extending upwardly from the base portion and having a helically arranged flange surface extending circumferentially about an outer surface of the part-cylindrical portion, wherein, in use, the presentation of the presentation surface of the connector to the presentation surface of a second coupler and subsequent relative rotation of the two connectors effects a mating of the two insert housings so as to form a cylindrical sleeve, the mating been achieved by the engagement of the respective flanges surfaces within the retention regions of the opposing connector, the engagement of the respective flange surfaces effecting an axial movement of the presentation surfaces of each connector so as to abut one another, thereby forming a mated connector coupling.

The invention also provides a connector comprising:

a sleeve having a presentation surface and a retention region defined adjacent to and extending at least partially about the perimeter defined by the presentation surface, the sleeve adapted to threadably receive an insert housing, the insert housing having a base portion with an upper abutment surface and a part-cylindrical portion extending upwardly from the base portion to an upper surface, the part-cylindrical portion having a helically arranged flange extending circumferentially about an outer surface of the part-cylindrical portion, and tapering downwardly from the upper surface, wherein the connector sleeve is rotatable in an axial direction about a co-operating connector, the rotation of the connector sleeve effecting the movement into and retention of the flange within the retention region of the co-operating connector, the rotation further effecting the unthreading of the base from the sleeve and the movement of the abutment surface of the first connector towards the end surface of the co-operating connector so as to form an inner cylinder, and the movement of the presentation surfaces of the two co-operating connectors in an axial direction into abutment.

A hermaphroditic connector adapted for forming a mated coupler with a co-operating equivalent connector is also provided by the present invention, the connector having:

a) an insert housing having a base portion and an part-cylindrical portion extending upwardly from the base portion, and having a helically arranged flange on an outer surface of the part-cylindrical portion, b) an outer sleeve having a retention portion disposed adjacent a presentation surface of the outer sleeve, the retention portion extending at least partially about the presentation surface and dimensioned to as to receive the helically arranged flange of the co-operating connector, and wherein the insert housing is engageable within the outer sleeve, the engaging arrangement enabling an axial movement of the insert housing relative to the outer sleeve upon rotation of the outer sleeve relative to the insert housing.

The insert member according to one aspect of the present invention has no pin and socket. The alignment is provided by lugs on the edge of the insert. These lugs or upstanding edges provide a more accurate angular alignment mechanism than previously obtainable. When the insert member is used to house optical elements, the lug arrangement allows optical elements to be protected by a large coated window so that any contamination is easy to clean away. Furthermore, the insert member of the present invention may be adapted for both expanded beam and butt joint connections. Also, there are fewer nooks or crannies to harbour dirt. Thus, if the connector is used for an expanded beam connector, an optical insert member of the present invention provides for high precision alignment of the optical components without the use of a protruding alignment pin. This allows the insert member to have a protective window that covers all of the optical elements thereby making it neat and clean. A seal that retains both the protective window and prevents the ingress of any incident water which may otherwise contaminate the optical components, may be provided on the insert member. The insert member of the present invention is also suited for butt joint harsh environment connector systems, both in optical and electrical adaptations. With the insert member of the present invention the optical fibres are brought into contact without a requirement for an alignment sleeve making it easier to clean.

According to one aspect of the present invention there is provided an insert member for a connector, the insert member comprising a body structure with an hermaphroditic profiled end. Preferably, the body structure is substantially cylindrical. The profiled end is adapted to mate with a similarly profiled end on a second insert member. Preferably, the profiled end comprises one or more, typically two, upstanding edges and one or more, typically two, recesses. Preferably, the upstanding edges and recesses are profiled such that one such edge is mateable with and mates with one such recess.

Preferably two such edges are provided at opposing sides of said end and preferably two such recesses are provided at opposing sides of said end, said recesses being substantially perpendicular and at right angles to said edges. Preferably, the insert member comprises one or more through bores for receiving one or more optical fibre ferrules and/or lenses. Typically if employed the lenses are spherical.

The insert member may be further adapted to incorporate a single window element extending across an open end of the bores. Preferably, if incorporated, the insert member further comprises a seal for retaining the window element to said body structure. Preferably the window element extends across substantially the whole end of the body structure other than at the peripheral edge thereof. The insert member may be provided with a recess to accommodate said window element.

The insert member may be further adapted to incorporate a plurality of lobes extending radially outwardly from the body of the insert member. Typically the lobes are provided at the distal end of the body from the profiled end of the body structure. The lobes are adapted to provide an easy alignment mechanism for aligning an insert member within an insert housing, and are therefore adapted to facilitate only one position of insertion. Preferably, three such lobes are provided and are not equally spaced circumferntially about the end of the body structure.

The lobes are preferably adapted to be received in corresponding channels in a housing in which the insert member is to be housed during use.

The invention also describes a connector and insert member for connectors substantially as hereinafter described with reference to the following drawings.

BRIEF DESCRIPTION OF THE DRAWINGS

FIG. 3 is an exploded view of a hermaphroditic connector in accordance with a second embodiment of the present invention showing an insert housing being presented to its sleeve, FIG. 4 is a perspective view of the connector of FIG. 3 with the insert housing inserted within the sleeve and a second connector being presented thereto, FIG. 5 is a perspective view of the two connectors of FIG. 4 with the insert housings in a presented but un-mated position, with the outer sleeves removed, FIG. 6 is a view similar to that of FIG. 5 with the insert housings in a mated position, FIG. 7 is a section through a portion of the sleeve of FIG. 3

FIG. 11 is a perspective view of an modification to the insert member of FIG. 9, and showing the presentation of fibre optic ferrules into the insert member, FIG. 12 is a perspective view of two mated insert members of the present invention, FIG. 13 is a perspective view of a modification to the insert member of the present invention, FIG. 14 is a view showing insert members of the present invention being presented to insert housings, FIG. 15 is a view of the insert members of the present invention within the insert housings.

DETAILED DESCRIPTION OF THE DRAWINGS

Figure 1:
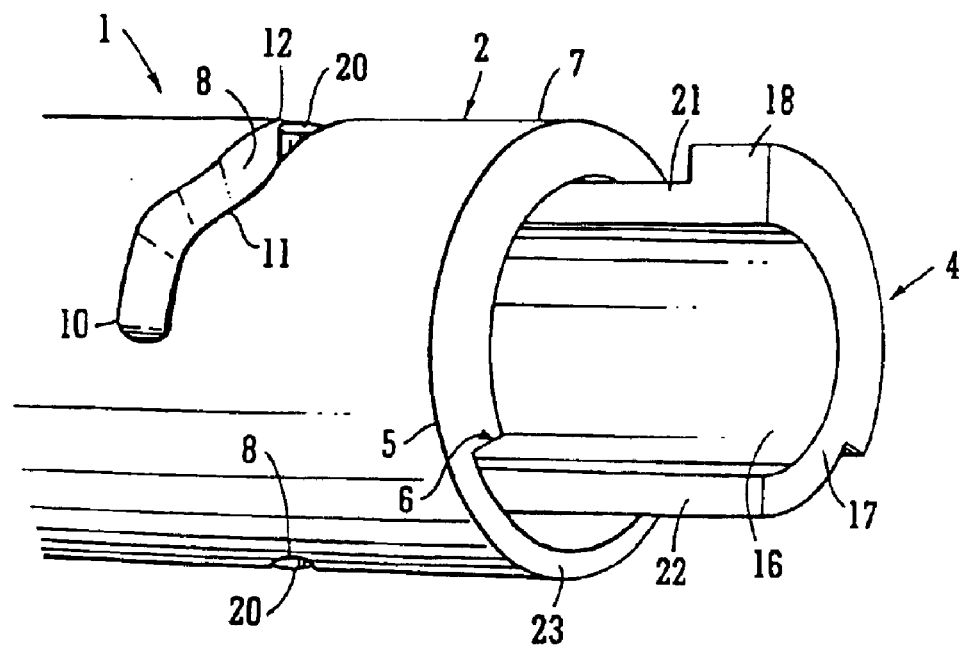
FIG. 1 is a perspective view of a hermaphroditic connector according to a first embodiment of the present invention.
Figure 2:
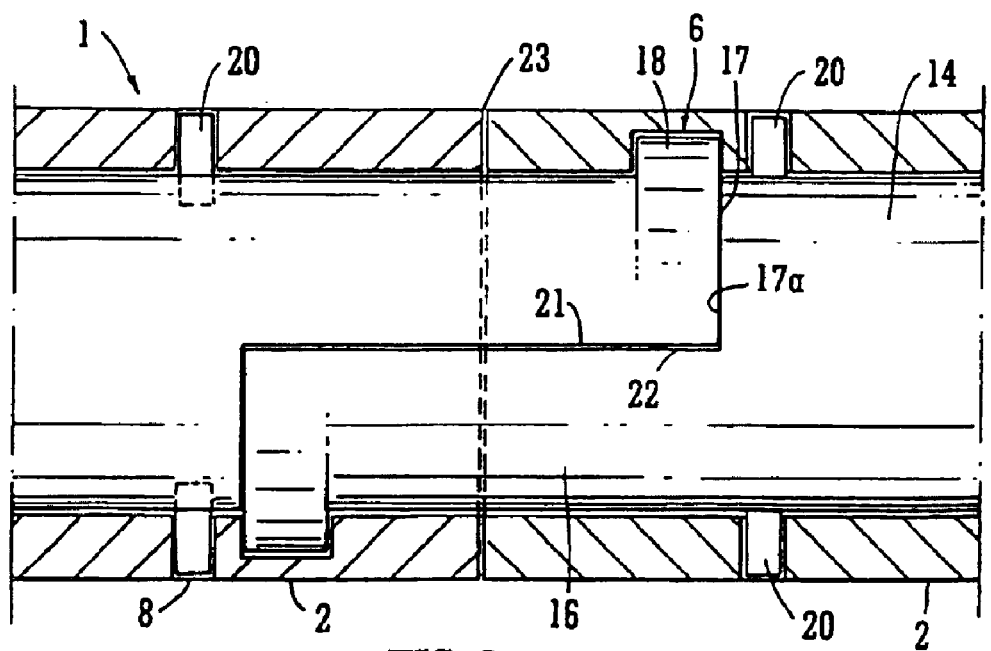
FIG. 2 is a longitudinal sectional view showing inter-engagement of two connectors of FIG. 1.

Referring to FIG. 1 and FIG. 2, a hermaphroditic connector 1 according to a first embodiment of the present invention comprises a substantially cylindrical outer sleeve 2 and an insert housing 4 adapted to receive an insert member. The insert housing 4 is slidably engaged within the outer sleeve 2.

The outer sleeve 2 has an engagement member comprising a peripheral lip 6 which extends inwardly from the outer sleeve wall 7 at the upper peripheral edge 5 thereof. The lip 6 extends partially around the diameter or circumference of the sleeve 2. The lip 6 may be defined by a partly peripheral groove provided internally on the sleeve wall spaced from the peripheral edge of the sleeve. A slot 8 is provided through the wall of the sleeve 2 for receiving a cam pin 20 which projects from the insert housing 4. The slot 8 is substantially helical in shape or has a lower horizontal portion 10 joined to an upper horizontal portion 12 by a central inclined portion 11 so that as the sleeve 2 is rotated relative to the insert housing 4, the cam pin 20 moves along the helical slot 8, thereby sliding the insert housing 4 within the outer sleeve 2 in a cam action. An equivalent second cam pin 20/slot 8 arrangement may be provided on the opposite side of the sleeve 2 to the first pin/slot arrangement to improve the sliding action of the insert housing 4 relative to the sleeve 2.

The insert housing comprises a substantially cylindrical base portion 14 and an upstanding half or part cylindrical portion 16. Thus, the insert housing 4 may be considered essentially a tube with a 180° cut out to a certain depth. A co-operable engagement member of the insert housing 4 is formed by a peripheral lip 18 which extends outwardly from the upstanding portion 16 at an upper peripheral edge 17 thereof. The lip 18 extends partially around the diameter of the upstanding portion 16.

Referring to FIG. 2, a pair of connectors are mated to form a coupling in use. The connectors are hermaphroditic so that identical connectors mate together without an adapter.

In order to mate the two connectors the insert housings of each connector are slid to the fully open position. Then, the two connectors are brought together with the upstanding portions 16 of the insert housings opposite each other to form together a cylindrical inner sleeve. Side faces 21, 22 of the corresponding upstanding portions are therefore directly opposing one another. The two connectors are then pushed together until the outer sleeves 2 contact. The outer sleeves 2 are rotated in opposite directions thereby causing the lips 18 of the insert housings 4 of each connector 1 to be trapped behind the lips 6 of the outer sleeve 2 of the opposite connector. The rotation of the outer sleeves 2 also causes the cam pins 20 to slide in their respective slots 8. This causes the inner housing 4 of each connector to move further away from its corresponding sleeve and be pushed towards the opposite connector. The side faces 21, 22 of the upstanding portions 16 of the insert housings 4 are in mutual contact and are prevented from moving axially because each peripheral lip 18 is trapped by the corresponding peripheral lip 6 of the outer sleeve of the opposite connector.

Thus, when two connectors of the invention are coupled together, the outer sleeves of each connector are pushed away from each other while the insert housings of each connector are pushed towards each other and away from their own sleeves. There is no relative linear movement between an insert housing of one connector and the outer sleeve of the opposite connector.

It will be appreciated that the mating and locking mechanism of the present invention is achieved by an interaction between the outer sleeve and the insert housings. Substantial axial alignment between the two connectors is achieved by the presentation of the two upstanding portions to form a cylindrical inner sleeve. Subsequent rotation of the outer sleeve about the opposing outwardly projecting lip secures this axial alignment. Complete locking and maintenance of the alignment of the opposing connectors is achieved when upper faces 17 of the opposing half connector insert housings are brought into abutment with upper faces 17a of the opposing insert housing.

FIGS. 3 to 7 show a second and preferred embodiment of the present invention. Again, in this embodiment a coupling is achieved by the mating of two connectors, or connector half portions 100. Each connector is substantially identical such that hermaphroditic coupling may be achieved. The individual connectors comprise an outer sleeve 101 and an insert housing 102. Similarly to that described with reference to the first embodiment, the outer sleeve 101 has an engagement member comprising an inwardly projecting lip member which defines a retention portion or region 103 and the insert housing 102 comprises a substantially cylindrical base portion 104 and a single or part-cylindrical upstanding portion 105 having co-operable engagement member formed by an outwardly projecting lip member 106. The upstanding portion 105 of the insert housing of the first connector is adapted to mate with and form a cylindrical inner sleeve 107 with a corresponding upstanding portion of the second connector. When looking inwardly from the mouth of the sleeve 101 towards the base portion 104 of the insert housing it will be apparent that, in use, the engagement of the outwardly projecting lip member 106 with the inwardly projecting lip member is effected by a retention of the outwardly projecting lip behind the inwardly projecting lip member 103 of the second connector to which the connector is to be mated.

The outwardly projecting lip member 106 may also be considered a flange or cam follower on the upstanding portion 105. In this embodiment, the outwardly projecting lip member is not parallel to an end surface 108 of the insert housing 102. Rather, the lip member 106 forms a helix extending circumferentially about an outside surface 109 of the upstanding portion 105. The helix has a start portion 110, typically beginning at the upper surface 108 of the upstanding portion and tapers downwardly towards the base portion 104 to an end portion 111. The start portion 110 and end portion 111 are preferably coincident with side faces or edges 112, 113 of the upstanding portion 105. The start portion 110 is, in use, the initial portion of the outwardly projecting lip member 106 that is presented to the inwardly projecting lip member 103 of the sleeve 101 of a co-operating connector, and so as to facilitate ease of interengagement is typically chamfered or rounded. As shown in FIG. 7 the inwardly projecting lip member 103 of the outer sleeve defines a retention region 150 which is dimensioned so as to receive the outwardly projecting lip member 106. The retention region 150 defines a cam in which the cam follower 106 is engageable with and moveable within.

The base portion 104 has an abutment end surface 117 and a base 118. A series of threads 114 are formed on an outer surface 119 of the base portion 104 and extend upwardly from the inner region or base 118 of the base portion, and are adapted to threadably engage with corresponding threads 115 within the sleeve 101. The threads are preferably angled so as to be opposite to that of the angle of thread of the helically formed lip member 106. Typically, this is achieved by having the base portion threads 114 left handed threads and the thread formed by the helically angled lip member right handed. The pitch of the helically arranged flange 106 is chosen to be incrementally greater than that of the pitch of the base portion threads 114. The choice of the degree of increment of the helix is typically such that the helix has a faster pitch, and therefore will rotate faster, than the threading of the base portion threads 114, although it will be appreciated that alternative relationships between the pitch on the helix and the pitch on the base portion threads may be suitable.

By choosing a left hand pitch for the base portion threads 114 it will be appreciated that in this example, when looking into the sleeve from an upper end surface 116, the insert housing is mated with its corresponding outer sleeve by an anti-clockwise rotation and engagement of the threaded portion 114 with the sleeve threads 115. When inserted fully into the sleeve 101, a lower edge 111a of the end portion 111 is typically abutting the upper end surface 116 of the sleeve, as shown in FIG. 4. The lip member 106 overlaps the inwardly projecting lip member or engagement region 103 of its respective sleeve 101. It will be appreciated by those skilled in the art that if the thread direction of the helix and that of the base portion threads 114 is chosen to be the same direction, that problems with sticking of the insert housing within the outer sleeve may develop.

The base portion is typically additionally provided with an inner set of threads 120, also extending upwardly from the base 118. These threads are adapted to engage with an insert retainer/insert member combination (not shown), the retainer threadably engaging with the insert housing to secure an insert member which has previously been inserted into the insert housing. The insert member is typically a housing for optical fibres.

Although the engagement of the insert housing with the outer sleeve has been described with reference to a threading arrangement, it will be appreciated by those skilled in the art that alternative methods that achieve the same result would be equally applicable and suitable. Such examples include camming arrangements that allow for both axial and rotational movement of the insert housing relative to the outer sleeve. By using the term threading and un-threading, the present invention is not intended to be limited to the specific use of threads and screw arrangements, and these phrases are intended to cover equivalent techniques.

In use, two connectors 100 are presented to each other with the side faces 112, 113 of their insert housings opposite one another, as is shown in FIG. 4. FIG. 5 is a view with the outside sleeves 101 of each connector removed for convenience, showing this initial presentation position. The start regions 110 of each insert housing 102 are presented on the same axis and are co-linear on the axis of presentation. Similarly, the end regions 111 are also co-linear along the axis of presentation of the two connectors. The upper surfaces 108 of each insert housing are not in abutment with the upper abutment surface 117 of the base portion 104 of the opposing insert housing; a gap is present therebetween. A lower edge portion 121 of each end portion 111 is in contact, thereby forming a stepped helix. As there is no mutual interengagement between the components of the two connectors, no coupling is achieved in this presentation position, and each connector is freely removable from the other.

FIG. 6 is a view similar to that of FIG. 5, with the outside sleeves of each connector removed, after rotation of the outer sleeves 101 so as to form a coupling between the two connectors 100. The coupling is achieved by a clockwise rotation of the outer sleeves. The rotation of the outer sleeve 101 effects a dual movement of the insert housings 102.

Firstly, a tangential or circumferential movement of the outwardly projecting lip portions 106 is achieved wherein the outwardly projecting lip portions 106 of each insert housing 102 rotate about one another so as to engage with and be retained within the inwardly projecting lip members 103 of the opposite sleeve 101. This inter-engagement is achieved by the threading of the helically formed lip members 106 within the retention sleeve 103. The start portion 110 of each helix moves from an initial presentation position within the sleeve to a retention position which is substantially co-linear with the initial presentation position of the end portion 111. This rotation of the helix lip member 106 also effects a movement of the upper surface 108 of each upstanding portion in an axial direction towards the upper surface 117 of the base portion. The axial movement is such that the two surfaces eventually abut, thereby forming a cylindrical inner sleeve 107, as shown in FIG. 6. The axial movement is facilitated, in part, by the unthreading of the insert housing relative to its outer sleeve, so that the each insert housing moves closer to its opposite insert housing.

Figure 8:
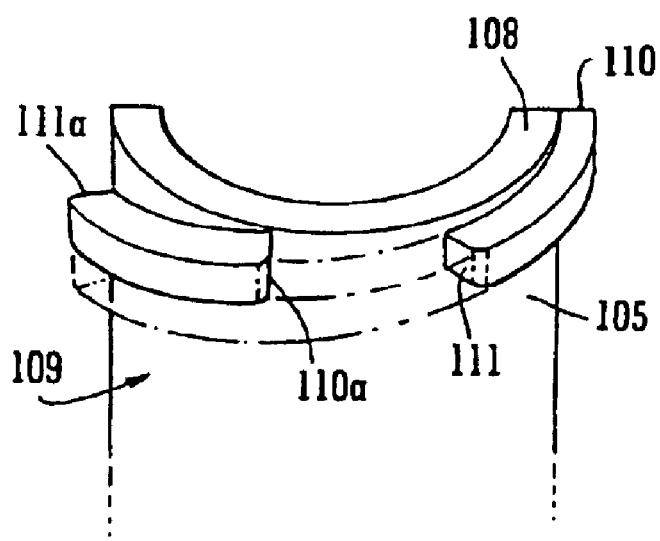
FIG. 8 is a perspective view of a modification to the insert housing of the present invention.

FIG. 8 shows an alternative embodiment of the helix arrangement on the insert housing. In this embodiment, the outwardly projecting member or helix is provided with two start portions 110, 110a which results in two end portions 111, 111a being formed, i.e. the outwardly projecting member is formed of two distinct portions and a discontinuous helix is formed on the outer surface 109 of the upstanding portion 105 of the insert housing. By employing a dual helix it is possible to distribute, over two points of contact, the location of engagement between the insert housing and the outer sleeve of the opposing connector half portion with which it is engageable. This may assist in limiting the possibility of jamming when forming a locked connector coupling. It will be appreciated by those skilled in the art that it is possible to modify the insert member of the present invention to employ multiple helix formations of different quanta and different applications may require the use of devices having two or more helixes. It will be appreciated that when such a multiple helix formation is used as the co-operable engagement member or surface of the insert housing, that some modification is necessary to the engagement member or region of the outer connector sleeves so as to complement the alteration to the insert housing.

In a modification, (not shown), to the sleeves hereinbefore described, a seal may be positioned within the upper end surfaces of the sleeves. The provision of a seal is such that on achieving the final locking position with the abutment of opposite end surfaces 116 of the opposing sleeves 101, a sealed connector coupling is also achieved.

The coupling and locking mechanism of the present invention is achieved by the relative rotation of the outer sleeves with respect to one another. It will be appreciated that although this has been described with reference to the movement of both outer sleeves, the coupling mechanism of the present invention will also be effected with the movement of only one sleeve. In such situations, the singularly moving sleeve will have to rotate more than in situations where both sleeves are rotating in order to achieve the same locking.

Such a singular rotation to effect locking is applicable in situations where a connector requires coupling to a bulkhead, which is similar to where the locking is facilitated by the rotation of one sleeve while the other sleeve is kept stationary, as described above. In such situations, the rotation of the connector sleeve effects the movement of both insert housings, both insert housings are withdrawn from their respective threading arrangements within their sleeves or bulkhead housings by the threading action of the helix lip members within their respective retention portions.

It will be appreciated by those skilled in the art that although the single upstanding portion of the present invention is shown in both embodiments as consisting of a single part, that equivalently two or more parts extending on the same axis may substitute for this single upstanding part. It will be understood that the phrase "single upstanding portion" is intended to describe both an upstanding portion of a single part and an upstanding portion of two or more parts which together form a single arc portion extending about at least a portion of the circumference of the insert housing and substantially on the same hemispherical or semi-cylindrical portion of the insert housing.

It will be further appreciated by those skilled in the art that although the present invention has been described with reference to the insert housing having the outwardly projecting lip portion 106 which is adapted to engage behind the inwardly projecting lip portion 103 of the outer sleeve that an opposite arrangement may be equally suitable, i.e. where the upstanding portion 105 defines a receiving portion adapted to receive a lip formed on the outer sleeve; the invention provides an engagement means for an insert housing having a first engagement means to co-operate with and engage with a compatible engagement means of an opposing sleeve; this mutual interengagement provides a coupling between two opposing connector half portions. It will also be appreciated by those skilled in the art that the outwardly projecting lip members may comprise a ball race comprising a series or balls or bearings located in a casing, the casing being helically dimensioned, so as to effect a helical channel of moveable balls.

The connector coupling mechanism of the present invention is radically different from the known lug and screw method outlined above in the section "Background to the Invention". The coupling action of the present invention is easier to achieve with a short twist and click operation rather than a tricky initial alignment of the lugs, followed by a screw action, which requires considerable force. The connector comprises an hermaphroditic connector for a butt joint or an expanded beam optical connector where the shells can be brought into alignment and with only a few degrees of twist alignment is achieved and the locking mechanism is completed. The connector of the present invention is resistant to an application of approximately 2000 N (Newtons) of applied force across a sealed connector and 6000 N of crush force onto a sealed connector.

Figure 9:
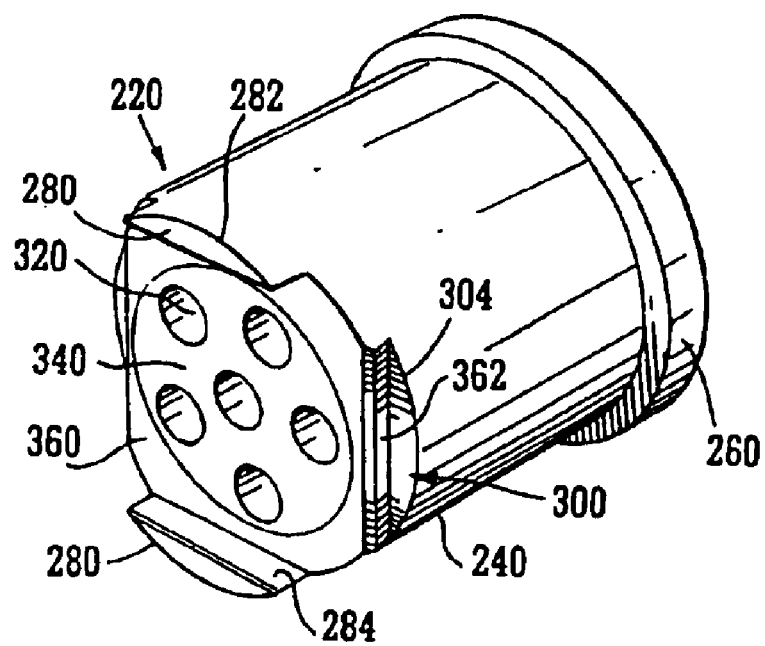
FIG. 9 is a perspective view of a first embodiment of an insert member according to the present invention.

FIG. 9 shows an insert member 220 according to the present invention. It comprises a substantially cylindrical body 240 having a peripheral flange 260 at one end thereof. The other end of the body 240 remote from the flange 260 has a hermaphroditic mating profile such that two such insert members 220 may be abutted end to end. The profile is such that when two such insert members 220 are mated, their mutual engagement prevents relative rotation between such insert members. The engaging profile comprises two upstanding peripheral edges 280 at diametrically opposed sides of the body 240, and two peripheral recesses 300 at diametrically opposed sides of the body 240, the recesses extending at right angles to the upstanding edges.

The recesses 300 are profiled to correspond to the profiles of the upstanding edges 280 such that, in use, when two insert members are mated, the edges 280 of one insert member locate in the recesses 300 of the other member and vice versa. Typically, the edges 280 have an outer side or surface 282 having a curvature corresponding to that of the cylindrical body 240 and an inner side or inner engagement surface 284 which is substantially straight or planar. Similarly, the recesses 300 have an outer side wall 302 at least a portion of which is adapted to engage with the inner engagement surface 284 of the upstanding edge 280. The exterior portion of the base of the recesses has a perimeter of curvature 304 corresponding to that of the cylindrical body 240.

One or more longitudinal through bores 320 are provided through the insert member 220 for receiving one or more optical fibre ferrules, electrical cable connectors or the like. Typically, the central region of the body 240 which accommodates the bores 320 is recessed from the mating profiled end of the insert member to form a recess 340, typically circular, having a surrounding peripheral raised edge 360 which in use acts to protect the optical elements located in the bores.

Such a circular recess 340 may also accommodate a single large circular window for protecting the optical elements, while allowing visual access to each bore. It will be appreciated by those skilled in the art that the inner dimensions of each bore may have to be adapted so as to enable the fitting of a fibre optic ferrule or electrical connector therein.

Figure 10:
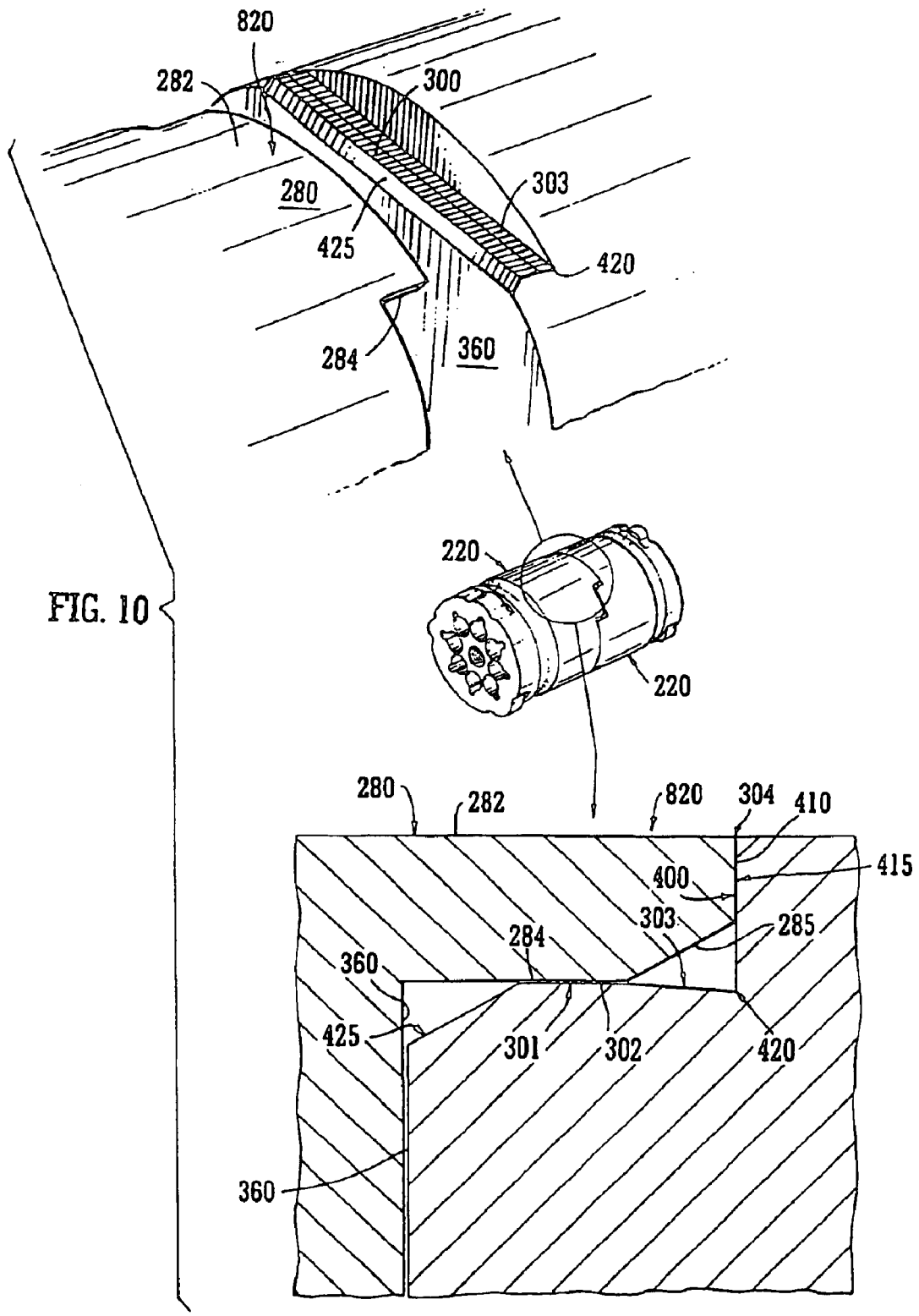
FIG. 10 is a detail, both in perspective and section of a hermaphroditic mating region of the insert member of the present invention.

FIG. 10 details the hermaphroditic profiled end 820 of the insert member of the present invention. As detailed previously with regard to FIG. 9, the profiled end 820 has an engaging profile comprising two upstanding peripheral edges or lugs 280 at diametrically opposed sides of the body 240, and two peripheral recesses 300 at diametrically opposed sides of the body 240, the recesses extending substantially at a right angle to the upstanding edges, such that on presentation of two compatible insert members 220, each upstanding lug 280 of a first insert member has a corresponding recess 300 with which it is engageable on the second insert member.

Each upstanding lug 280 comprises a presentation surface 400, which, when in a mated position, is presented to and abuts against a corresponding presentation surface 410 of the recess 300. The presentation surface 400 is substantially planar, extending inwardly and transversely to the outer surface or side 282 of the upstanding lug 280. At a distal location from the outer surface 282 the presentation surface 400 tapers inwardly towards an inner side or inner engagement surface 284, forming a taper region 285 therebetween.

Similarly, the recess 300 has a side wall 301 located between the base 415 of the recess and the peripheral raised edge 360 of the insert member 220. A portion of the side wall 301 defines a recess engagement surface 302, the recess engagement surface 302 being adapted to engage with the inner engagement surface 284 of the upstanding edge or lug 280. A presentation surface 410 of the recess forms a portion of the base 415 of the recess, the base 415 extending from the perimeter 304 of the recess inwardly and substantially perpendicularly to the outer circumference of the insert member 220 to a corner 420 remote from the perimeter, where it meets the inner side wall 301.

At the corner 420, an outwardly and upwardly extending lower taper region 303 of the side wall 301 is formed, the lower taper region 303 extending from the base of the recess toward the recess engagement surface 302. The profiles of the recess engagement surface 302, the inner engagement surface 284, and the two presentation surfaces 410, 415 are such that when two corresponding insert members are mated, as shown in FIG. 10, these surfaces abut one another. The area formed, when the two corresponding insert members mate, between the lower taper region 303 of the recess and the taper region 285 of the upstanding edge, defines a dirt collection area where any dirt that is incident on the mating surfaces may collect, thereby ensuring that a good mating between the respective insert members is achievable.

Between the recess engagement surface 302 and the peripheral raised edge 360 of the insert member, the side wall 301 tapers inwardly again, forming an upper taper region 425 of the recess. The upper taper region is tapered inwardly at an angle of approximately 60° C. To the perpendicular, and facilitates ease of presentation of the upstanding edge or lug to its respective recess.

In one exemplary embodiment of the present invention, the side wall of the recess is approximately 1.8 mm, the upper taper region being 0.6 mm, and the recess engagement surface 0.45 mm. To ensure a good mating between opposing insert members, it is preferential to define the dimensions of the recess side wall to be slightly less than that of the upstanding edge. This ensures that when mated, the presentation surfaces of the two opposing insert members come into contact prior to any contact between the upper peripheral edges 360 of the respective insert members. The interference fit provided by the interaction of opposing upstanding edges and the recesses enables a 3–8 micron interference, typically about 5 microns, which effects good quality optical mating for the fibre optic ferrules mounted within each insert member. If one attempts to provide too much interference between the opposing insert members, then a phenomenon of galling may occur, too little may result in a loose interengagement.

FIGS. 11 to 15 show an insert member 800 somewhat modified from the insert member hereinbefore described. The same reference numerals will be used to describe equivalent components. Again, in this embodiment the insert member comprises a cylindrical body 240 having a hermaphroditic profiled end region 820 with upstanding edges and recesses similar to that described with reference to the previous embodiment. The body 240 has a circumferential groove 840 for accommodating a seal in order to assist the securement of the insert member within a connector insert housing, which may be of a conventional type, or the type of the present invention, as hereinbefore described. The end 860 of the body remote from the hermaphroditic profiled end region 820 comprises a plurality of lobes 880 which extend radially outward beyond the principal circumference of the body 240. Typically, three such lobes 880 are provided and are not equally spaced about the circumference of the end region 860. In this preferred embodiment, the lobes are defined by longitudinally recessed regions 900. Thus, the end region 860 comprises three lobes 880, each lobe being defined by a recess on either side thereof and non-lobed regions 920 extending between adjacent recesses 900. The non-lobed regions 920 have an external curvature corresponding to that of the cylindrical body 800 and form an extension thereof. The lobes 880 project beyond the outer circumference of the body 800.

In use (shown in FIGS. 14 and 15), the insert member 800 locates in an insert housing 102 such that the lobes 880 align and locate with corresponding channels 885 formed in the internal wall of the insert housing 102. Thus, typically the insert housing internal wall has three channels 885 formed therein, the channels being not equally spaced around the internal circumference. The channels 885 correspond to the depth and curvature of the lobes 880. Such an assembly allows quick and easy alignment of the insert member within the insert housing. An upper surface 881 of each lobe 880 contacts and abuts an end wall 886 of a corresponding channel, such end wall 886 being provided in the housing at the desired longitudinal spacing from an open end of the housing. FIG. 15 shows inserted insert members 800 within their respective insert housings 102. As detailed previously with respect to the description of the insert housings, once the insert member has been correctly inserted within the housing 102, it is possible to secure the member therein by threading an insert retainer (not shown) using the internal screw threads 120 of the insert housing 102.

Each insert member has a plurality of longitudinal bores provided therethrough. As detailed previously, these bores are adapted to accommodate optical ferrules or electrical connectors depending on the application of the connector coupling. The bores typically comprise, at the end region 860 of the body remote from the hermaphroditic profiled end, a main aperture 940 serving as an entry port for the introduction of the ferrules into the housing. The bore extends from this main aperture 940 through the body of the insert member to an exit port 946 at the end of the body proximal to the hermaphroditic profiled end 820. As shown in FIGS. 11 and 12, a second sub-aperture 945 may be provided adjacent the main aperture 940 and intersecting a peripheral edge of the corresponding main aperture to form a keyhole effect bore. The keyhole effect may extend partially or fully along the length of the bore. In use, an optical fibre ferrule 950 is provided with a peripheral lug 955 which locates in the sub-aperture 945 of the bore, thereby providing accurate and stable alignment of the ferrule within the bore. The mating of the lug with the sub-aperture prevents rotational movement of the ferrule within the bore. In addition, the provision of a single sub-aperture for each bore ensures that the ferrule can be axially aligned only in a single desired direction. This simplifies the assembly process considerably, and is particularly important in situations where the end face of the ferrule is tapered to form a presentation surface, the angle of which is adapted to mate with a corresponding ferrule in the opposing insert member and therefore the angle of presentation of the two ferrules is critical.

It will be appreciated by those skilled in the art that the central region of the insert member, such as shown in FIG. 13, which accommodates the bores 940 may be recessed from the end 860 if so required; for example to accommodate additional components of the ferrules.

Figure 17:
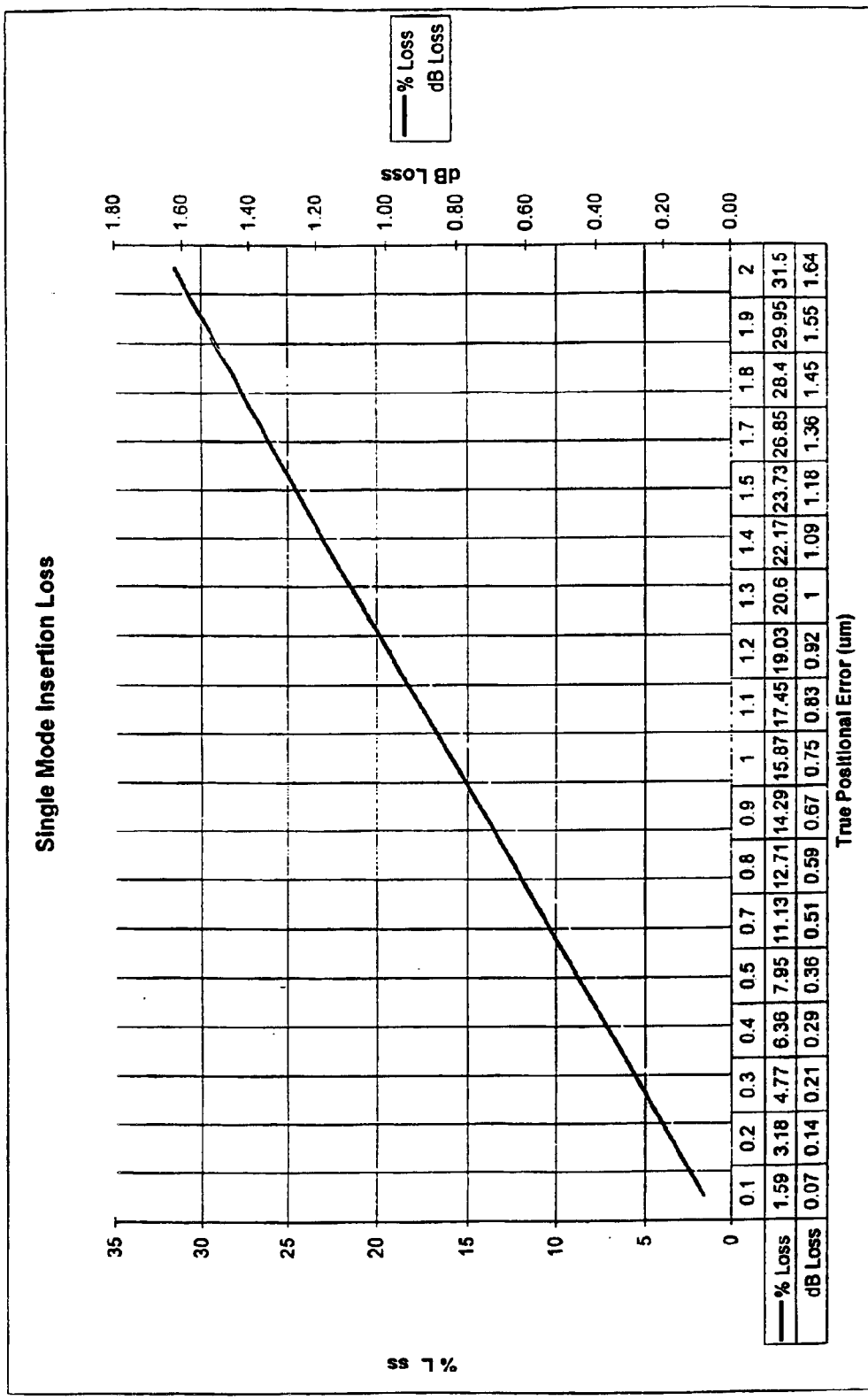
FIG. 17 is a graph showing single mode insertion loss for an insert member of the present invention.
Figure 18:
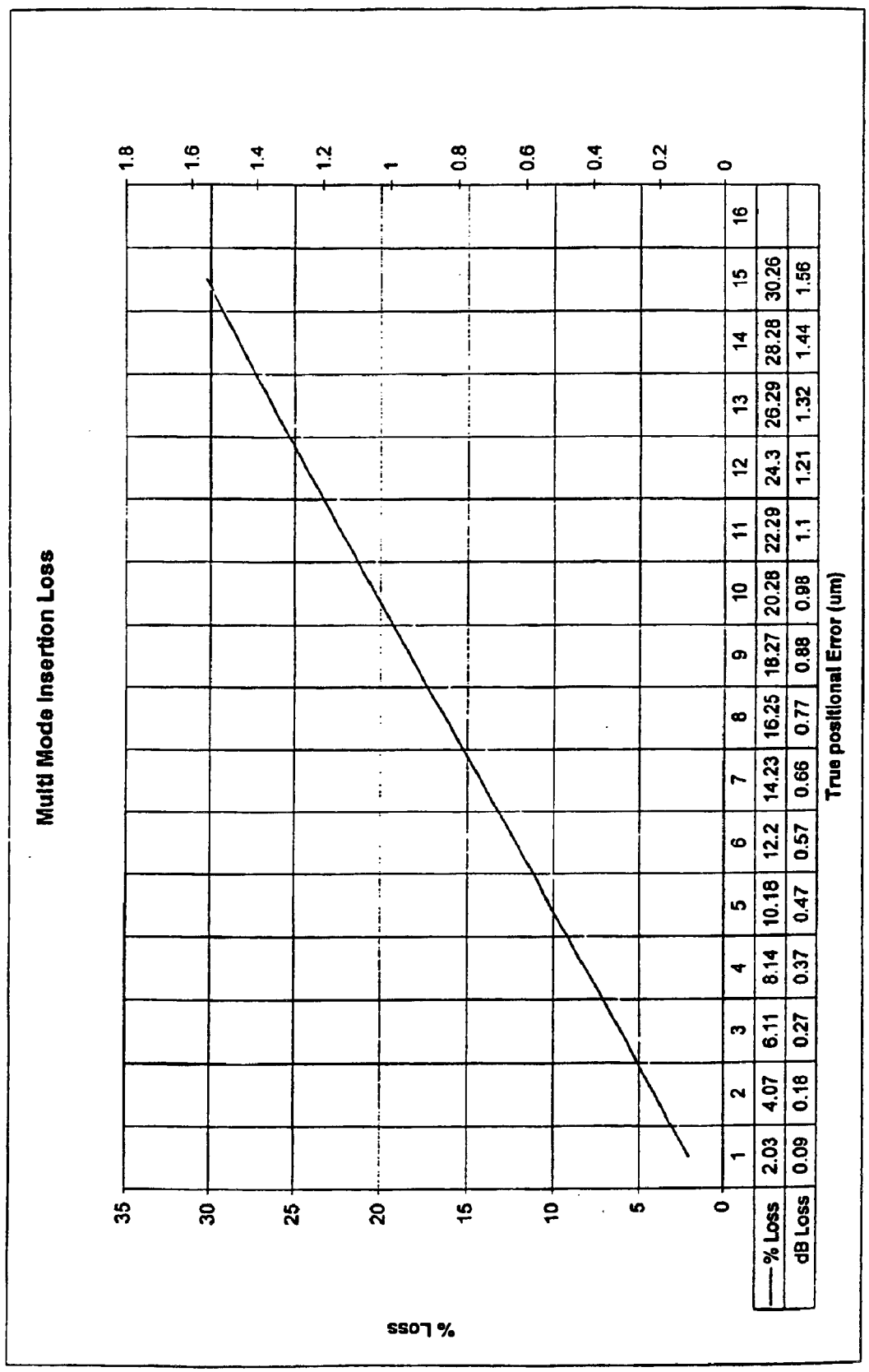
FIG. 18 is a graph showing multi-mode insertion loss for an insert member of the present invention.

One specific application of the present invention involves the connection of 8 optical fibre channels, each optical fibre being locatable in a respective individual bore 940 of the insert member. It is desirable to mate the respective channels from one insert member with those of the other member to within a 1 micron accuracy. For example, in the situation of using a butt joint connection between opposing single mode fibres, it is common to have to align an 8 micron fibre with an equivalent 8 micron fibre in the opposing insert members. It is evident that any deviation from true mating will result in poor transmission through the connector and high losses. FIGS. 17 and 18 are graphs illustrating the % loss against true positional error for connectors of the present invention in both single and multimode application, and an examination of the Figures shows the importance of correct alignment. Performance of any connector is measured in terms of light loss (in dB); the light loss being equivalent to insertion loss. Therefore, an improved means of aligning the connectors results in improved connector characteristics. At 1300 nm, insertion losses for connectors of the present invention have been found to typically be:

| | |
|---|---|
| Single mode expanded beam: | 0.6 dB |
| Multi mode expanded beam | 0.45 dB |
| Multi mode butt joint | 0.25 dB |

By comparison, known expanded beam type connectors typically display insertion losses in the region 1.2–2.5 dB.

Figure 16:
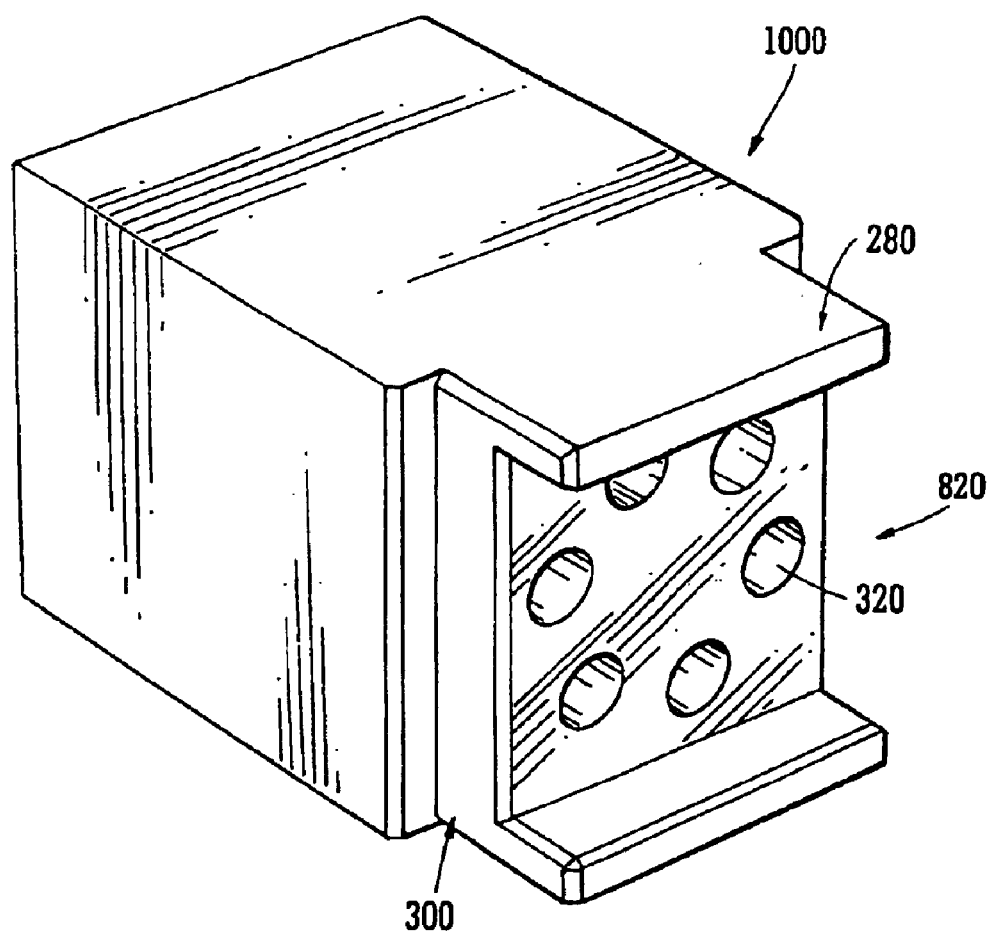
FIG. 16 is a perspective view of an alternative embodiment of the insert member of the present invention.

It will be appreciated by those skilled in the art that although the insert member has hereinbefore been described with reference to a substantially cylindrical outer circumference, that any alternative polygonal shaped insert member may be found to be more suitable for a specific application. For example, FIG. 16 shows a modification to the insert member previously described. In this embodiment, the member 1000 is substantially rectangular, but again incorporates co-operable upstanding lugs 280 and recesses 300 at the hermaphroditic mating presentation region 820 of the insert member 1000. This embodiment is specifically suited to electronic connector applications and may be tooled from plastic material. It will be further appreciated that although the insert member and insert housing of the present invention have been described and illustrated with reference to specific individual components that for specific applications it may be advantageous to integrally form an insert housing with an insert member.

Words such as "top", "above", "upper", "lower", "upwardly", "downwardly", "inwardly", "outwardly" "base", "behind", "in front", "upstanding" and the like are used herein with reference to the positions of the connectors and/or the components thereof illustrated in the drawings and do not necessarily relate to the positions adopted when the connectors are in use. Such terms are used without limiting effect. The words "comprises/comprising" and the words "having/including" when used herein with reference to the present invention are used to specify the presence of stated features, integers, steps or components but does not preclude the presence or addition of one or more other features, integers, steps, components or groups thereof.

What is claimed is:

1. A hermaphroditic coupling comprising a first and a second connector, each connector (1, 100) comprising an outer sleeve (2, 101) and an insert housing (4, 102), the outer sleeve (2, 101) having an engagement member (6, 103) and the insert housing (4, 102) comprising a substantially cylindrical base portion (14, 104) and a single upstanding portion (16, 105) having a co-operable engagement member (18, 106), the outer sleeve being rotatable about the insert housing, and wherein rotation of the outer sleeve effects an axial movement of the insert housing such that, in use, the rotation of the outer sleeve of the first connector effects a movement of the upstanding portion (16, 105) of the insert housing (4, 102) of the first connector so as to mate with and form a cylindrical inner sleeve (107) with a corresponding upstanding portion of the second connector, the engagement member (6, 103) being adapted to engage in use with the co-operable engagement member (18, 106) of the second connector to which the connector is to be mated.

2. The coupling as claimed in claim 1 wherein the outer sleeve engagement member (6, 103) is an inwardly projecting lip member adapted to receive and engage with a co-operable outwardly projecting lip member (4, 106) of the insert housing.

3. The coupling as claimed in claim 2 wherein the outwardly projecting lip member (4, 106) extends at least partially about a perimeter of the upstanding portion (16, 105).

4. The coupling as claimed in claim 3 wherein the outwardly projecting lip member (106) comprises two or more portions, each portion extending partially about a perimeter of the upstanding portion.

5. The coupling as claimed in claim 1 wherein the connector (1) includes a cam in the form of a pin (20) on the insert housing (4) which engages with a slot (8) on the outer sleeve (2).

6. The coupling as claimed in claim 5 wherein the slot extends through two lateral dimensions of the sleeve such that relative rotation of the housing with respect to the outer sleeve causes linear movement between the housing and the outer sleeve or vice versa.

7. The coupling as claimed in claim 1 wherein on presentation of the first connector to the second connector, a relative rotation of the outer sleeves causes the co-operable engagement members of the insert housings to be moved about the engagement members of each connector, and effects a movement of the inner housings into mutual contact.

8. The coupling as claimed in claim 1 wherein the co-operable engagement members (106) and engagement members (103) are helically dimensioned, a rotation of an outer sleeve (101) effecting an engagement of the co-operable engagement member of a first connector and the engagement member of a second connector and the drawing of the insert housings (102) into mutual contact.

9. The coupling as claimed in claim 8 wherein the co-operable engagement member forms a helically arranged flange surface extending circumferentially about an outer surface of the upstanding portion.

10. The coupling as claimed in claim 9 wherein the engagement member (103) of the outer sleeve forms a retention region adjacent to a presentation surface (116) of the outer sleeve, and wherein, in use, the presentation of a first connector to a second connector and subsequent relative rotation of the two connectors effects a mating of the two insert housings so as to form a cylindrical sleeve (107), the mating been achieved by the engagement of the respective flange surfaces within the retention region of the opposing connector, the engagement of the respective flange surfaces effecting an axial movement of the presentation surfaces of each connector so as to abut one another, thereby forming a mated connector coupling.

11. The coupling as claimed in claim 1 wherein the insert housing is threadably engageable with its respective outer sleeve.

12. The coupling as claimed in any preceding claim 11 wherein a relative rotation of the outer sleeve of the first connector with respect to that of the second connector effects an axial movement of the two insert housings toward one another.

13. The coupling as claimed in claim 11 wherein a rotation of the outer sleeve effects a rotation of the co-operable engagement member relative to the engagement member of the opposing connector thereby unthreading an insert housing from its insert sleeve, and drawing opposing insert housings into mutual contact.

14. The coupling as claimed in claim 1 wherein the insert housing is adapted to receive an insert member.

15. A connector insert member (220) having a body with an hermaphroditic profiled end portion (820), the end portion adapted, in use, to mate with a corresponding end portion of a second insert member, the end portion comprising at least one upstanding lug (280) located on a perimeter of the end portion and at least one recess (300) also formed on the perimeter of the end portion, said at least one upstanding lug being dimensioned so as to be engageable with a corresponding recess portion formed on the second insert member, the engagement of opposing lugs and recesses forming a mated assembly, and wherein the at least one lug comprises a presentation surface (400) which, when in a mated position, is presented to and abuts against a corresponding presentation surface (415) of the recess (300), each lug further comprising an engagement surface (284) which, when in a mated position, abuts against a recess engagement surface(302), the abutment of the two presentation surfaces and two engagement surfaces of opposing lugs and recesses in a mated position forming an interference fit between opposing insert members, wherein the end portion comprises at least two tugs and two recesses; and wherein the body comprises a plurality of bores (320) extending therethrough, the bores adapted to receive one or more of the following:
a) optical fibre ferrules
b) electrical connector.

16. The connector insert member as claimed in claim 15 wherein a central region of the body (240) which accommodates the bores is recessed from the profiled end to form a recess (340).

17. The connector insert member of claim 16 wherein the recess is adapted to receive a protective window.

18. The connector insert member of claim 15 wherein at least one of the bores is provided with a keyhole effect entry port (940, 945), the keyhole effect adapted to co-operate with a peripheral lug (955) located on a fibre ferrule (950) so as to effect only one possible entry position of the ferrule into the bore.

19. The connector insert member as claimed in claim 15 further comprising a plurality of lobes (880) extending radially outwardly from the body (240) of the insert member.

20. The connector insert member as claimed in claim 19 wherein the plurality of lobes are asymmetrically arranged circumferentially about the body of the insert member.

21. The connector insert member as claimed in claim 15 being adapted to be received within an insert housing (102) of a connector assembly.

22. The connector insert member as claimed in claim 21 wherein the lobes (880) on the insert member are adapted to co-operate with channels (885) formed within the insert housing (102), the cooperation of the lobes and channels effecting alignment of the insert member within the insert housing.

23. The connector insert member as claimed in claim 21 when integrally formed within the insert housing of a connector assembly.

24. A coupling as claimed in claim 1 further comprising an insert member (220) having a body with an hermaphroditic profiled end portion (820), the end portion adapted, in use, to mate with a corresponding end portion of a second insert member, the end portion comprising at least one upstanding lug (280) located on a perimeter of the end portion and at least one recess (300) also formed on the perimeter of the end portion, said at least one upstanding lug being dimensioned so as to be engageable with a corresponding recess portion formed on the second insert member, the engagement of opposing lugs and recesses forming a mated assembly.

\* \* \* \* \*